Oct. 21, 1947.   R. J. MILLER   2,429,364
MOTION-PICTURE PROJECTOR
Filed April 14, 1947   2 Sheets-Sheet 1

INVENTOR.
RAYMOND J. MILLER
BY
Gregory S. Dolgorukov
ATTORNEY.

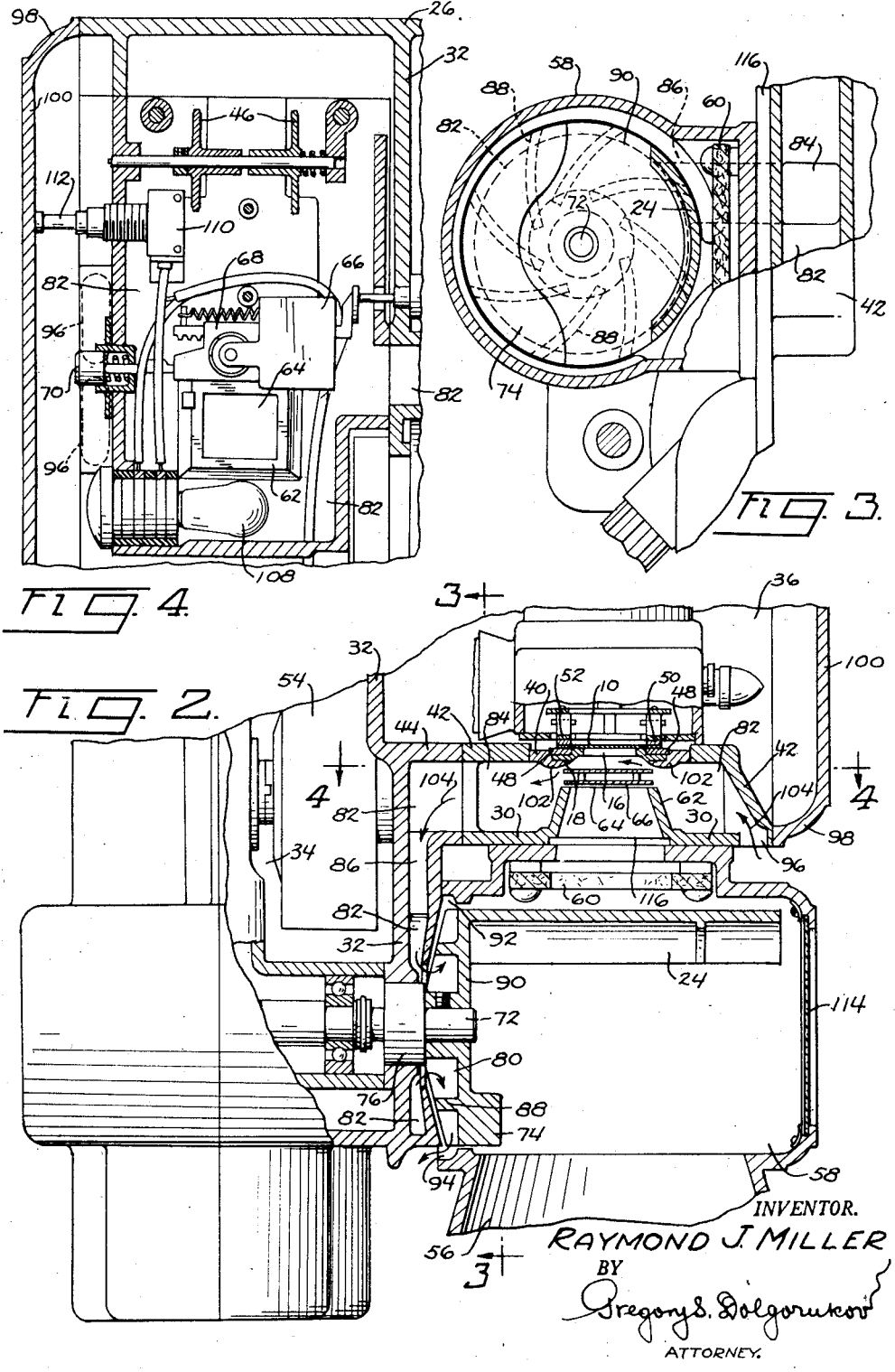

Patented Oct. 21, 1947

2,429,364

UNITED STATES PATENT OFFICE 2,429,364

MOTION-PICTURE PROJECTOR

Raymond J. Miller, Detroit, Mich.

Application April 14, 1947, Serial No. 741,259

8 Claims. (Cl. 88—17)

This invention relates to motion picture projectors and more particularly to an improved projector having means preventing objectionable overheating of the projector, particularly in the locality of the aperture plate, as well as overheating of the film. The present application is a continuation-in-part of my co-pending application Serial No. 379,962 filed February 21, 1941, the latter application being a continuation-in-part of my prior application Serial No. 250,310 filed January 11, 1939, and now U. S. Letters Patent No. 2,312,663 granted to me on March 2, 1943.

Construction of modern motion picture projectors with respect to incorporation therein of means preventing overheating of such projectors in operation is governed by several mutually conflicting requirements presenting an extremely difficult problem. One of such requirements is a very high intensity of illumination required on the projection screen which, usually being of a relatively large size reaching in some instances the size of 3,500 square feet, requires very powerful light source to provide required unit illumination for such a large area. At the present time electric arc light is considered to be the only adequate light source for such intensive illumination. It should be understood that all the light that reaches the screen and is dispersed over its entire area has to pass through the film aperture, which aperture is of a fixed size and is less than one-half of one square inch in area. Thus the light concentration required at the aperture plate may be nearly 750,000 times that required at the screen. The beam of such a concentrated light, which may be compared for the purposes of description to a beam of sunlight focused at nearly a point by a large lens, is passed through the film made of highly inflammable material, usually cellulose nitrate. Even a small fraction of a second of exposure of the film to such light concentration would ignite the film, causing violent combustion of the entire reel and possibly a fire of serious proportions. Due to the constantly present possibility of panic in the audience, occurrence of a fire in a theatre may have grave consequences irrespective of the actual size of the conflagration. The actual period of time during which the film is retained stationary in alignment with the aperture of a present day projector is only approximately 1/48 of one second; increasing this time eight or nine times, i. e. to approximately 1/6 of one second may cause instant overheating and inflammation of the film. In order to prevent such an increase of time of film exposure to the light beam, safety fire shutters are now required by law in motion picture projectors used for demonstrations to public audiences, which safety fire shutters are actuated by centrifugal type governors to close and to interrupt the light when the speed of the film falls down to a predetermined limit.

While the high speed of the film motion and presence of the safety fire shutter take care of the danger from the light which is passed actually through the film, there remains a large portion of intense light of extremely high heating value which does not pass through but falls on portions of the projector structure, constantly imparting to it large quantities of heat in the immediate locality of the film aperture. It is clear that unless this heat is dissipated, the temperature of the projector in the locality of the aperture plate will rise very quickly and the heat will be passed to the aperture plate raising its temperature to the point when treating the film, i. e. operatively arranging it by hand at the aperture plate in engagement with driving means, will become very difficult, and upon further operation of the projector making possible inflammation of the film by contact with the hot aperture plate. This heat may be considered herein in two of its main portions, namely, the portion of the heat that is imparted to the rotating shutter operating to interrupt the light while the film is being moved, and the portion which passes the shutter but is imparted to the structure of the projector structure immediately surrounding the profiling apertures of the projector; the latter portion of the heat is often referred to as "spillage light heat."

The rotating shutter operating in the path of the light absorbs a considerable portion of the heat of projected light during the entire cycle, as well as all of the heat during the time when it interrupts the light, which is approximately 20% of the cycle time. Unless the shutter is cooled, its temperature will rise beyond permissible temperature, bringing about overheating of the projector.

As to the heat of the spillage light, this heat is particularly dangerous because it is imparted to the projector structure very close to the aperture plate and partly directly into it, and moreover is caused by the light of nearly maximum concentration. The light of the electric arc is reflected by a concave mirror and is directed as a converging beam of light toward the film aperture. The cross section of such a beam is approximately circular and therefore if it were projected onto the rectangular film aperture, the marginal portions of the beam outside of the area of the aperture would impart all of its heat directly into the aperture plate. To prevent such a dangerous condition, the beam is "profiled" prior to its reaching the aperture plate to have a rectangular cross section, in order to reduce by such an expedient the marginal areas of the aperture plate receiving the spillage light of full concentration and of high heating intensity. The final profiling of the picture frame is done at the aperture plate, with the film running on aperture plate tracks with a very small clearance, such as approximately .010 of an inch, from the aperture piece in which the profiling aperture is provided.

The preliminary profiling is done at the "light port" or a similar opening provided in a suitable member interposed in the path of the projected light. Provision of such a member introduced a number of serious difficulties. First of all, there is a problem of removal of heat from such a member. It can be appreciated in view of the foregoing that unless this is done, such a member will soon be heated to nearly red heat and the heat imparted thereto will be transferred, in part at least, to the aperture plate. The second difficulty results from the tendency of the air to flow through the light port, thus forming air currents which have been found very objectionable, particularly if directed into electric arc compartment. Air flow into the arc compartment was found to produce flickering and wandering of the arc, noticeable on the screen. The flow of air from the arc compartment toward the film has been found also objectionable, since this air is very hot and carries with it incandescent and very abrasive arc ashes, usually sodium silicate which is one of the products of combustion of the electrodes, which ashes are very injurious to the film and the delicate film-actuating mechanisms.

Many attempts have been made to solve these difficulties. Removal of the heat from the profiling member was attempted by surrounding it with a water jacket and circulating water therethrough. Such means introduced other complications into the construction and use of the projectors. It was also attempted to laminate such a profiling member and to blow the air under considerable pressure through the laminations. Such expedients produced the danger of blowing into the arc compartment and producing the undesirable interference with the arc. Moreover, the use of independent blowing means made these expedients rather unreliable, since failure of the blower or mistake of the operator could cause the projector to operate with stalled cooling system. Flow of the air through the light port was attempted to be prevented by closing this port with the aid of a lens means termed "condenser lens." While being successful in preventing the flow of air into the arc compartment, such means materially reduced intensity of illumination, and have been considered undesirable for this and other reasons.

One of the objects of the present invention is to provide an improved motion picture projector in which the above difficulties are overcome and largely eliminated with the aid of simple and inexpensive means.

Another object of the invention is to provide an improved motion picture projector having an aperture plate or a similar member contacted by the film, in which plate or member there is effected such a heat balance that equilibrium of the quantities of heat imparted to that member and dissipated thereby is reached at a desirably low temperature, such for instance as at a temperature not to high for touching such member with the hand.

Another object of the invention is to provide an improved motion picture projector having an aperture plate or a similar member contacted by the film, in which projector there are provided means whereby a substantial portion of the heat of the projection light beam which otherwise would be imparted to the aperture plate and the film, and particularly the heat of the spillage light, is intercepted before it reaches the aperture plate, and is carried away into the atmosphere.

A further object of the invention is to provide an improved motion picture projector of the character specified in the preceding paragraph, in which projector there are provided means operating to remove from the aperture plate or an equivalent member the heat which passes through the above mentioned heat intercepting means and is imparted to the aperture plate, said means operating also to cool the light beam itself by providing a medium absorbing from the light beam a portion of rays having high heating value, and furthermore to provide a layer of cool clean air immediately adjacent the film to protect it from the incandescent abrasive ashes which may be carried by the air flowing through the open light port toward the film.

A still further object of the invention is to provide an improved motion picture projector in which the undesirable flow of the air from the arc compartment toward the film is controlled and is held at such an intensity that its injurious tendencies remain within the protective capacity of the means specified in the preceding paragraph.

A still further object of the invention is to provide an improved projector adapted to utilize an electric arc light and having an open light port, means being provided to prevent the flow of air into the arc compartment and the resulting interference with the arc.

A still further object of the invention is to provide an improved motion picture projector of the above character, having means whereby the heat imparted to the light-interrupting shutter is removed therefrom at a rate ensuring that the temperature of the shutter does not rise above a predetermined limit even in a prolonged operation of the projector.

A still further object of the present invention is to provide an improved motion picture projector of the foregoing character, in which projector cooling is effected by means of a convection air current, and particularly by circulation of atmospheric air through the projector with the aid of blower means operating to create a partial vacuum, rather than pressure, in the locality of the film, said blower means being furthermore driven by the film-actuating mechanism, whereby starting of the projector and bringing the film to the speed where the safety fire shutter opens is accompanied or results also in operation of the blower means.

It is a further object of the present invention to provide an improved motion picture projector having a cooling system of the foregoing character, which system is simple and rugged in construction, safe and dependable in operation, and which is relatively inexpensive to manufacture.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 2 is a plan view partly in section of a portion of the projector illustrated in Fig. 1.

Fig. 3 is a section view taken substantially on the line 3—3 of Fig. 2, looking in the direction of the arrows.

Fig. 4 is a sectional view taken substantially on the line 4—4 of Fig. 2, looking in the direction of the arrows.

Figure 1:
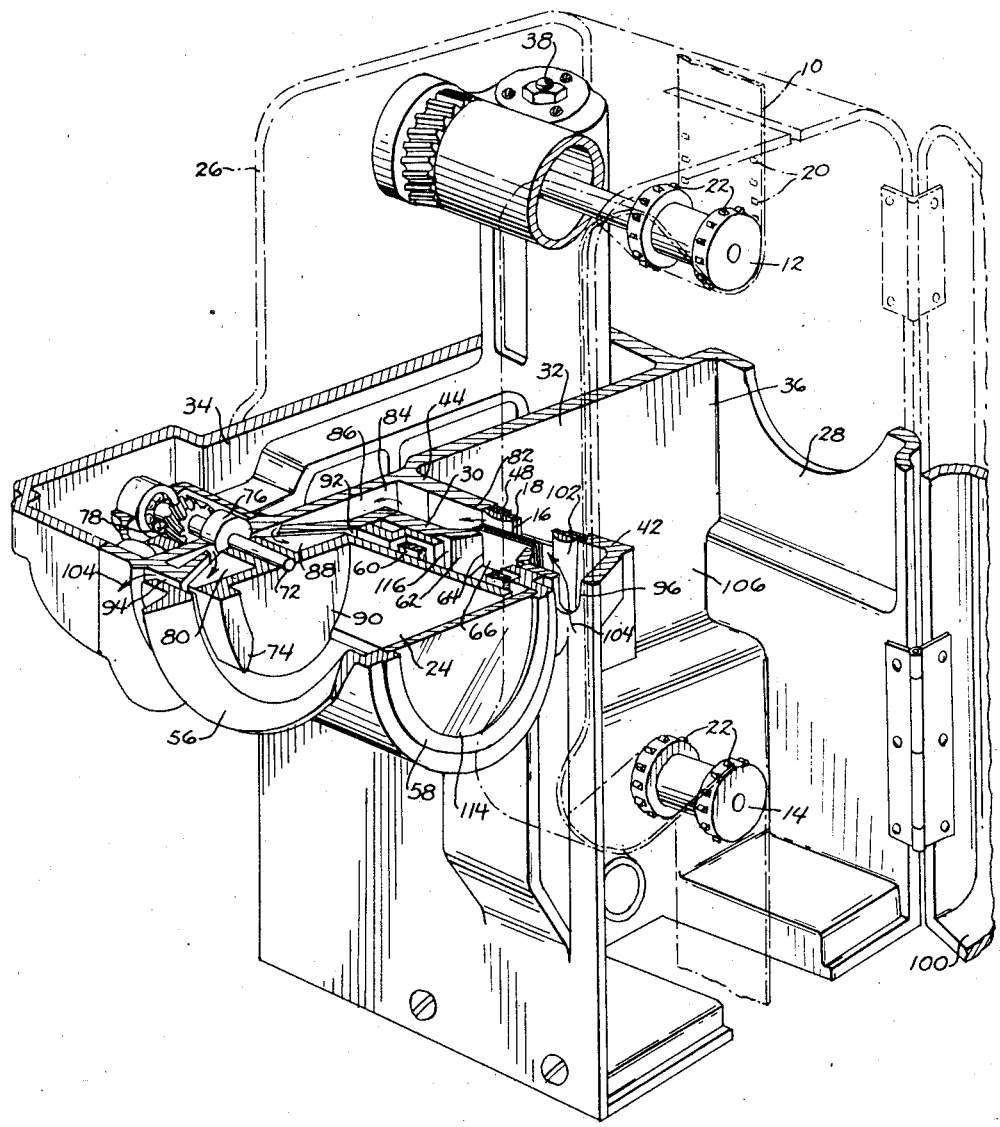
Fig. 1 is a perspective view partly in section of a motion picture projector embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Fig. 1, it will be observed that the invention is illustrated as being embodied in a motion picture projector wherein a plurality of separate visual images are carried by a strip of celluloid or other suitable film material 10. In one form of projector used commercially in theaters, the film 10 is approximately thirty-five millimeters in width, and the separate images are carried by a plurality of substantially equally spaced successive frames. Where the thirty-five millimeter film is employed it has been found that very desirable results are obtained where sixteen separate frames are provided in a foot of film.

Means such for example as an intermittently driven sprocket may be provided to intermittently move the film 10 between upper and lower feed sprockets 12 and 14 to intermittently position succeeding frames of the film into alignment with an aperture 16 formed in an aperture plate 18. Light from a suitable source, particularly an electric arc, is directed to impinge on the aperture plate 18 and pass through the aperture 16 and the film 10 to project the image from the film onto a screen so positioned as for example in a theater, to be viewed.

In the thirty-five millimeter film generally used for commercial projection the film 10 is provided adjacent each frame with four sprocket receiving apertures or holes 20 to receive sprocket teeth 22 extending radially at the outer edges of the driving sprockets 12 and 14 and an intermittently driven sprocket whereby the film 10 may be moved to position successive frames of film into alignment with the aperture 16. Each of the film driving sprockets is preferably provided with sixteen driving teeth 22 on each side and thus moves four frames of the film in one complete revolution.

The film may move at any predetermined speed. However, it has been found that best results are obtained from the sound equipment now conventionally used with motion picture projectors when the film is driven at a speed of approximately ninety feet or 1440 frames per minute, that is, at the rate of one and one-half feet or 24 frames per second.

To drive the film at this speed the intermittence drive sprocket must be actuated 1440 times per minute, making a quarter revolution each time it is actuated, and the upper and lower feed sprockets 12 and 14 must be continuously driven at a speed of 360 R. P. M.

One complete revolution of the intermittently driven sprocket will move four frames, and since this sprocket makes six complete revolutions per second, it must be actuated through a complete cycle each 1/24 of a second. This cycle must be further subdivided since an interval of time is required to move the film. Good results have been obtained where this cycle is divided into five equally spaced time intervals of 1/120 of a second each. One of these time intervals of 1/120 of a second may be utilized to actuate the intermittently driven sprocket to position the next succeeding frame of the film in alignment with the aperture 16, and each individual frame may be maintained in alignment with the aperture the remaining 4/120 of a second of each cycle of 1/24 of a second to permit light from a suitable source to pass through the aperture 16 and film 10 to project the image from the film onto the screen.

A shutter such for example as a rotatable blade 24 is provided to intermittently interrupt the flow of light through the film 10 and aperture 16 to prevent the images on the screen from becoming blurred or streaked as the intermittently driven sprocket moves successive frames of the film 10 into alignment with the aperture 16. The shutter blade again cuts the light substantially 180° later to prevent visible flicker.

Each of the frames of the film is subjected to the full heat intensity of the projecting light during the interval of time when it is aligned with the aperture 16 when the shutter blade 24 is not interrupting the projecting light to prevent visible flicker or to shield movement of the film. Each frame of the film is therefore subjected directly to the heat of the light for approximately 1/48 of a second while it is aligned with the aperture 16, and in addition is subjected to heat conducted to it through the aperture plate 18. In view of the fact that the film 10 is made of inflammable material, a considerable fire hazard is thus involved.

The component elements of the projector may be carried by a main housing 26 having front and back walls 28 and 30 respectively and an intermediate wall 32 dividing the space within the housing 26 into transversely spaced mechanism and film compartments 34 and 36 respectively.

The mechanism required to drive the film sprockets 12 and 14, the intermittently driven film feeding sprocket, and the shutter 24 may be positioned within the mechanism compartment 34. The driving mechanism preferably includes a generally vertically extending drive shaft 38 operably connected to drive generally horizontally extending shafts projecting through and suitably sealed in the intermediate wall 32 to prevent the escape of lubricating oil from the compartment 34 to the film compartment 36.

A film track carrier 40 supports the aperture plate 18 having the aperture 16 formed therein. The carrier 40 may be supported by an aperture plate housing 42 preferably aligned with a wall 44 projecting transversely from the wall 32.

The film 10 is preferably guided between guide rollers 46 and moves between spaced tracks 48 and shoes 50 yieldingly urged towards the tracks 48 by springs 52. The film is thus maintained in proper alignment with the aperture 16 and restrained from moving a greater distance than is desired each time the intermittently driven sprocket is actuated by the driving mechanism associated with the flywheel 54.

The projecting light may emanate from any suitable source, preferably electric arc, preferably positioned behind the back wall 30 and the light is admitted into the film compartment 36 through a conical housing 56 communicating with a shutter housing 58 having the rotatable shutter blade 24 therein. A fire shield 60 formed of fireproof material such for example as asbestos may be interposed between the shutter housing 58 and a preferably inwardly extending baffle or light tube 62 formed in the back wall 30. The baffle or light tube 62 terminates in a light admission port 64 aligned with the aperture 16 formed in the aperture plate 18.

A fire shutter or gate 66 mounted on a suitable actuating frame 68, more fully disclosed in my co-pending application Serial No. 250,310, now U. S. Patent No. 2,312,663, issued on March 2, 1943, may be provided to automatically close the space between the aperture 16 and port 64 adjacent the baffle or light tube 62 to interrupt the flow of projecting light and heat to the film in the event that the projector fails to operate at the desired speed. A manually operated member 70 may be provided to move the fire valve 66 to the operative position illustrated in Fig. 4 when the projector is not operating.

Any desired form of shutter such for example as those disclosed in my co-pending application Serial No. 250,310, now U. S. Patent No. 2,312,663, issued on March 2, 1943, may be employed to interrupt the projecting light when the film 10 is being intermittently moved to align succeeding film frames with the aperture 16. One desirable form includes the rotatable shutter blade 24 mounted on a shaft 72 and provided with a counterbalancing weight 74. The shaft 72 projects through a suitable oil seal 76 positioned in the intermediate wall 32 and is operably connected through suitable gearing 78 with a generally horizontally extending shaft which may drive the intermittently driven film feeding mechanism including the flywheel 54.

Means are provided to withdraw heat from the projecting light and to cool the film, aperture plate and the associated parts of the projector subjected to heat during operation of the projector.

One desirable form of such cooling means comprises a blower 80 communicating directly with the atmosphere on one side, and communicating with the atmosphere on its other side by way of a manifold 82 and an aperture cooling chamber 84. The manifold passage 82 is formed by the intermediate wall 32 and the wall 44 aligned with the aperture plate housing 42, a portion of the back wall 30, and an extension 86 thereof. The aperture cooling chamber 84 is positioned between the back wall 30 and baffle or light tube 62 on one side, and the aperture plate housing 42, the film track carrier 40, and the aperture plate 18 on the other side.

The blower 80 is provided with impeller blades 88 carried by a disk 90 supporting the shutter blade 24 and the counterweight 74. The blades 88 rotate in a suitable housing 92 communicating with atmosphere on one side by way of a plurality of apertures 94, which by way of example may be discharge apertures.

Cooling air may be withdrawn from the atmosphere through inlet apertures 96 formed in the back wall 30 adjacent the vertical edge of the aperture plate housing 42 adapted to be engaged by a vertically extending portion 98 of a side door 100 to seal the film compartment 36 from the aperture cooling chamber 84.

The cooling air is thus drawn from the atmosphere through the inlet apertures 96 into the aperture cooling chamber 84 where it passes across the aperture plate housing 42, film track carrier 40 and is directed by venturis 102 carried by the film track carrier to impinge on and cool the aperture plate 18 and film 10 aligned with the aperture 16. The cooling air is then propelled through the manifold 82 to the housing 92 of the blower where it is discharged to atmosphere by the blades 88 through the apertures 94. The direction of the flow of air through the aperture cooling chamber 84, manifold 82 and blower 80 is indicated by the arrows 104.

Attention is called to the fact that the flow of cooling air is confined to the aperture cooling chamber 84 and manifold 82, and that the air within the film compartment 36 is not disturbed. The possibility of dirt entering the film compartment to injure the delicate film positioning and moving mechanism and the projector lenses is therefore minimized.

The flow of cooling air into, out of and through the aperture cooling chamber 84 causes virtually no disturbance of air in the shutter housing 58 because the flow of air through the inlet apertures 96 across the chamber 84 to the manifold 82 is less restricted than it is through the shutter housing 58 and the light admission port 64 of the inwardly directed baffle or light tube 62. There is thus virtually no tendency for the cooling air to set up disturbing air currents which might interfere with the operation of the light source such for example as an arc light.

If desired, the blower may be a separate unit not associated with the shutter mechanism, and may be positioned in any convenient location to direct cooling air through the space between the aperture plate and the shutter mechanism without departing from the spirit of my invention.

A framing light 108 preferably positioned in the aperture cooling chamber 84 may be provided to permit observation of the film 10 through an observation port positioned forwardly of the aperture plate 18 to determine whether the frames of the film are in proper alignment with the aperture 16. A switch 110 having a plunger 112 positioned to be engaged by the door 100 when in the closed position may be provided to permit the light to be illuminated when the door is open and to shut it off when the door is closed.

A glass 114 positioned in the shutter housing 58 may be provided to permit inspection of the projecting light with reference to the fire shield 60 to facilitate adjustment of the light relative to the aperture plate 18 and aperture 16.

A channel 116 formed in the back wall 30 adjacent the baffle or light tube 62 may be provided to receive a valve member whereby the projecting light may be interrupted to facilitate changing over from one projector to another when a reel of film is exhausted or for any other purpose.

I claim:

1. In a motion picture projector adapted to utilize an electric arc light and to project such light along a predetermined line, an aperture plate spaced from the arc and having a film aperture, means adapted to pass a film in close proximity to said aperture; an air circuit for carrying away heat tending to be imparted to the film by the arc light, said circuit comprising a cooling chamber having an intake opening and a discharge opening communicating directly with the atmosphere, said chamber being formed, in part, by two spaced walls extending transversely to the line of projected light, the wall disposed closer to the arc having an open port disposed in said line of light and providing at predetermined moments a path for the light from the arc to said aperture entirely through the air space, the wall disposed further away from said arc being adapted to carry said aperture plate; a light tube provided within said chamber along the line of light, said tube having one open end connected to one of said walls, with its free open end terminating within said chamber at a distance from the other wall; and blower means adapted to create a flow of atmospheric air through said chamber around said tube and past the free end thereof.

2. In a motion picture projector adapted to utilize an electric arc light and to project such light along a predetermined line, an aperture plate spaced from the arc and having a film aperture, means adapted to pass a film in close proximity to said aperture; an air circuit for carrying away heat tending to be imparted to the film by the arc light, said circuit comprising a cooling chamber having an intake opening and a discharge opening communicating directly with the atmosphere, said chamber being formed, in part, by two spaced walls extending transversely to the line of projected light, the wall disposed closer to the arc having an open port disposed in said line of light and providing at predetermined moments a path for the light from the arc to said aperture entirely through the air space, the wall disposed further away from said arc being adapted to carry said aperture plate; a substantially tubular heat-absorbing extension provided within said chamber along the line of light, said extension having one open end connected to one of said walls, with its free open end terminating within said chamber at a distance from the other wall; and blower means adapted to create a flow of atmospheric air through said chamber around said heat-absorbing extension and past the free end thereof to carry away the heat imparted by the arc light to said extension and to provide a cooling layer of moving air across the open free end of said extension.

3. In a motion picture projector adapted to utilize an electric arc light and to project such light along a predetermined line, an aperture plate spaced from said arc and having a film aperture, means adapted to pass a film in close proximity to said aperture, an air circuit for carrying away a substantial portion of the heat tending to be imparted to the film by the arc light, said circuit comprising a blower having one side communicating with the atmosphere, a cooling chamber having one opening communicating directly with the atmosphere and another opening communicating with said blower, said chamber being formed, in part, by two spaced walls extending transversely to the line of projected light, the wall disposed closer to the arc having an open port disposed along said line of light and providing at predetermined moments a path directly through air space from said arc to the film, the wall disposed further away from said arc being adapted to carry said aperture plate, a light tube provided within said chamber and aligned with said port and said aperture and having open ends for the passage of light therethrough and inner walls diverging toward the arc, said tube having one of its open ends connected to one of said walls and its other open end free and terminating within said chamber, said blower being adapted to create a flow of cooling air through said chamber around the outer walls of the light tube and across the free end thereof, the flow of air across said free end being substantially in the plane of said end.

4. A construction as defined by the preceding claim 3, the light tube being of a hollow rectangular cross section, one of the outer walls of said light tube forming a baffle directing a portion of cooling air toward the film.

5. In a motion picture projector adapted to utilize an electric arc light and to project such light along a predetermined line, an aperture plate spaced from said arc and having a film aperture; means adapted to pass a film in close proximity to said aperture for operative alignment of the pictures of said film with said aperture; a shaft driven by the film actuating means; an interrupting shutter mounted on said shaft and adapted to interrupt the light at predetermined moments; an air circuit for carrying away a substantial portion of the heat tending to be imparted to the aperture plate and to the film by the arc light, said circuit comprising a blower having an impeller mounted on said shaft, said blower having its discharge side communicating with the atmosphere, a cooling chamber having one opening communicating with the atmosphere and another opening communicating with said blower, said chamber being formed in part by two spaced walls extending transversely to the line of projected light, the wall disposed closer to the arc having an open port disposed along said line of light and providing a path for the light, except when said path is interrupted by the shutter, directly through the air space from said arc to the film, the wall disposed further away from said arc being adapted to carry said aperture plate.

6. In a motion picture projector adapted to utilize an electric arc light and to project such light along a predetermined line, an aperture plate spaced from said arc and having a film aperture; means adapted to pass a film in close proximity to said aperture for operative alignment of the pictures of said film with said aperture; a shaft driven by the film actuating means; an interrupting shutter mounted on said shaft and adapted to interrupt the light at predetermined moments; an air circuit for carrying away a substantial portion of the heat tending to be imparted to the aperture plate and to the film by the arc light, said circuit comprising a blower having an impeller mounted on said shaft, said blower having its discharge side communicating with the atmosphere, a cooling chamber having one opening communicating with the atmosphere and another opening communicating with said blower, said chamber being formed in part by two spaced walls extending transversely to the line of projected light, the wall disposed closer to the arc having an open port disposed along said line of light and providing a path for the light, except when said path is interrupted by the shutter, directly through the air space from said arc to the film, the wall disposed further away from said arc being adapted to carry said aperture plate, a light tube provided within said chamber and aligned with said port and said aperture and having open ends for the passage of light therethrough, said tube being integrally formed on one of said chamber walls, said blower being adapted to create a flow of cooling air through said chamber around the outer walls of said light tube and across the free end thereof.

7. A construction as defined by the preceding claim 6, the intake opening of said chamber providing a communication thereof with the atmosphere being at least equal in area to that of the light port.

8. In a motion picture projector adapted to utilize an electric arc light and to project such light along a predetermined line, an aperture plate spaced from the arc and having a film aperture, said projector being adapted to provide at predetermined moments an unobstructed path for the arc light from the arc to said film entirely through air space, means adapted to pass a film in contact with said aperture plate for registration of the film picture frames with said aperture; an air circuit for carrying away heat tending to be imparted to the film by the arc light, said circuit comprising a chamber having an atmospheric intake opening and formed, in part, by two spaced walls extending transversely to the line of projected light, the wall disposed closer to the arc having an open port disposed on said line of light substantially perpendicular thereto, the wall disposed further away from said arc being adapted to carry said aperture plate; a blower operatively interposed in said circuit, said blower having its suction side communicating with said chamber and adapted to create a flow of free atmospheric air through said chamber transversely of the line of light from said atmospheric intake opening and to discharge such air directly into the atmosphere; means for driving said blower, said means being interconnected with the film actuating means.

RAYMOND J. MILLER.

REFERENCES CITED

The following references are of record in the file of this patent:

UNITED STATES PATENTS

| Number | Name | Date |
|---|---|---|
| 1,853,725 | Dina | Apr. 12, 1932 |
| 2,186,618 | Philips | Jan. 9, 1940 |
| 2,194,585 | Brenkert | Mar. 26, 1940 |
| 2,312,663 | Miller | Mar. 2, 1943 |
| 2,378,682 | Brenkert | June 19, 1945 |